US012568045B2

(12) United States Patent      (10) Patent No.:    US 12,568,045 B2

Li et al.      (45) Date of Patent:    *Mar. 3, 2026

(54) EXECUTION OF A COMMAND WITHIN A CONDITIONAL COMMAND RECEIVED IN A DATA PACKET

(71) Applicant: Futurewei Technologies, Inc., Addison, TX (US)

(72) Inventors: Renwei Li, Fremont, CA (US); Alexander Clemm, Los Gatos, CA (US); Uma S. Chunduri, Fremont, CA (US); Kiran Makhijani, Los Gatos, CA (US)

(73) Assignee: Futurewei Technologies, Inc., Addison, TX (US)

( * ) Notice: Subject to any disclaimer, the term of this patent is extended or adjusted under 35 U.S.C. 154(b) by 209 days.

This patent is subject to a terminal disclaimer.

(21) Appl. No.: 18/340,026

(22) Filed: Jun. 22, 2023

(65) Prior Publication Data

US 2023/0336488 A1     Oct. 19, 2023

Related U.S. Application Data

(63) Continuation of application No. 17/070,631, filed on Oct. 14, 2020, now Pat. No. 11,722,424, which is a
(Continued)

(51) Int. Cl.
*H04L 45/00*      (2022.01)
*H04L 45/02*      (2022.01)
(Continued)

(52) U.S. Cl.
CPC ............ *H04L 45/566* (2013.01); *H04L 45/02* (2013.01); *H04L 45/20* (2013.01);
(Continued)

(58) Field of Classification Search
CPC ..... H04L 47/2458; H04L 45/02; H04L 45/20; H04L 45/566; H04L 47/2441;
(Continued)

(56) References Cited

U.S. PATENT DOCUMENTS 6,414,939 B1    7/2002   Yamato
6,970,462 B1    11/2005   Mcrae
(Continued)

FOREIGN PATENT DOCUMENTS

CN      101783798 A     7/2010
CN      101785255 A     7/2010
(Continued)

OTHER PUBLICATIONS

Pat Bosshart et al: "P4: Programming Protocol-Independent Packet Processors", May 15, 2014 (May 15, 2014), XP055207217, DOI: 10.1145/2656877.2656890, 8 pages.

*Primary Examiner* — Omar J Ghowrwal

(57) ABSTRACT

A mechanism is disclosed for implementing conditional commands carried by network data packets. A data flow including a data packet is received. The data packet includes a conditional command. A condition and a command are obtained from the conditional command. The mechanism determines that the condition is satisfied. Based on the determination that the condition is satisfied, the command is executed to alter handling of the data flow, alter handling of the data packet, or alter a context for the data flow.

18 Claims, 6 Drawing Sheets

Related U.S. Application Data continuation of application No. 16/124,770, filed on Sep. 7, 2018, now Pat. No. 10,972,397.

(60) Provisional application No. 62/565,211, filed on Sep. 29, 2017.

(51) Int. Cl.

| | |
|---|---|
| *H04L 47/24* | (2022.01) |
| *H04L 47/2441* | (2022.01) |
| *H04L 47/32* | (2022.01) |
| *H04L 47/76* | (2022.01) |
| *H04L 49/00* | (2022.01) |
| *H04L 67/12* | (2022.01) |
| *H04L 69/22* | (2022.01) |
| *H04L 45/036* | (2022.01) |
| *H04L 45/037* | (2022.01) |
| *H04L 45/0377* | (2022.01) |
| *H04L 47/2483* | (2022.01) |
| *H04L 47/35* | (2022.01) |

(52) U.S. Cl.
  CPC ...... *H04L 47/2441* (2013.01); *H04L 47/2458* (2013.01); *H04L 47/32* (2013.01); *H04L 47/76* (2013.01); *H04L 49/3009* (2013.01); *H04L 67/12* (2013.01); *H04L 69/22* (2013.01); *H04L 45/036* (2022.05); *H04L 45/037* (2022.05); *H04L 45/0377* (2022.05); *H04L 45/08* (2013.01); *H04L 47/2483* (2013.01); *H04L 47/35* (2013.01)

(58) Field of Classification Search
  CPC ..... H04L 47/32; H04L 47/76; H04L 49/3009; H04L 67/12; H04L 69/22; H04L 45/08; H04L 47/2483; H04L 47/35; H04L 45/036; H04L 45/0377; H04L 45/037
  See application file for complete search history.

(56) References Cited

U.S. PATENT DOCUMENTS

| | | | |
|---|---|---|---|
| 8,139,583 B1 | 3/2012 | Burton, III et al. | |
| 10,972,397 B2 | 4/2021 | Li et al. | |
| 11,722,424 B2* | 8/2023 | Li | H04L 45/20 370/235 |
| 2005/0286517 A1 | 12/2005 | Babbar et al. | |
| 2006/0050719 A1 | 3/2006 | Barr et al. | |
| 2008/0291917 A1 | 11/2008 | Cassod et al. | |
| 2009/0080461 A1 | 3/2009 | Barri et al. | |
| 2013/0325994 A1* | 12/2013 | Chai | H04L 67/1097 709/208 |
| 2014/0280717 A1 | 9/2014 | Frost et al. | |
| 2015/0120924 A1 | 4/2015 | Scott et al. | |
| 2015/0135009 A1 | 5/2015 | Utaka | |

FOREIGN PATENT DOCUMENTS

| | | |
|---|---|---|
| CN | 102158409 A | 8/2011 |
| CN | 105681223 A | 6/2016 |
| CN | 106302266 A | 1/2017 |
| CN | 107210975 A | 9/2017 |
| EP | 2869535 A1 | 5/2015 |
| EP | 2985971 A1 | 2/2016 |
| JP | 2014017019 A | 1/2014 |

* cited by examiner

100

200

Downstream
Ports

Upstream
Ports

300

341     343     350     345     347

| Data Link Header | Network Header | Conditional Commands | Transport Header | Payload |

400

441     450     443     445     447

| Data Link Header | Conditional Commands | Network Header | Transport Header | Payload |

700

EXECUTION OF A COMMAND WITHIN A CONDITIONAL COMMAND RECEIVED IN A DATA PACKET

CROSS-REFERENCE TO RELATED APPLICATIONS

This application is a continuation of U.S. patent application Ser. No. 17/070,631 filed on Oct. 14, 2020, by Futurewei Technologies, Inc., and entitled "Execution of a Command within a Conditional Command Received in a Data Packet," which claims the benefit of U.S. patent application Ser. No. 16/124,770 filed on Sep. 7, 2018, and entitled "Execution of a Command within a Conditional Command Received in a Data Packet," which claims the benefit of U.S. Provisional Patent Application No. 62/565,211, filed Sep. 29, 2017, by Renwei Li, et al., and entitled "Self-Driving Packets with Conditional Instructions," which is hereby incorporated in its entirety.

BACKGROUND

Networks forward data packets based on dynamically learned routes. Network operations are further set to enforce the overall goals of the network, such as maximizing throughput, minimizing power consumption, etc. at times leading to over-subscription of resources, traffic congestion, and packet drops. Host nodes may connect to the network and employ network infrastructure to communicate data, for example on behalf of applications operating on the host nodes. Unfortunately, the communication goals of the host nodes and corresponding applications may conflict with the overall goals of the network. For example, the goal for an application operating on a host node may be to minimize latency for a corresponding communication. Meanwhile, the network goal may be to maximize overall throughput and network equipment utilization at a latency that is minimally acceptable. Further, the network may be unable to determine the best routing approach to take in order to meet the needs of the applications. For example, data packet payloads may be encrypted, which in turn prevents the use of deep packet inspection (DPI).

SUMMARY

In an embodiment, the disclosure includes a network device comprising: a receiver configured to receive a data flow including a data packet, the data packet including a conditional command; and a processor coupled to the receiver, the processor configured to: obtain a condition and a command from the conditional command; determine that the condition is satisfied; and based on the determination that the condition is satisfied, execute the command to alter handling of the data flow, alter handling of the data packet, or alter a flow context for the data flow. By including conditional commands in the data packet, a source node can control how a data flow and/or how particular packets are handled when traversing a network upon the occurrence of the condition(s). Hence, conditional commands allow for in-band control of network functions, where in-band indicates that control information is forwarded in the same channel as the communicated data.

Optionally, in any of the preceding aspects, another implementation of the aspect includes, wherein the conditional command further includes one or more command parameters, the command parameters containing data indicating a value that defines a set of operation conditions for the command. Including command parameters into the conditional command allows the commands to be customized, and hence provide greater in-band control of nodes along a flow path.

Optionally, in any of the preceding aspects, another implementation of the aspect includes, wherein the conditional command further includes a condition parameter, the condition parameter containing data indicating a value to support evaluation of the condition. Including conditional parameters into the conditional command allows the conditions to be customized, and hence provide greater in-band control of nodes along a flow path.

Optionally, in any of the preceding aspects, another implementation of the aspect includes, wherein the conditional command further includes a global parameter, the global parameter containing data indicating a value to support evaluation of all conditional commands in a header of the data packet or to support consuming information associated with the global parameter.

Optionally, in any of the preceding aspects, another implementation of the aspect includes, further comprising memory storing routing instructions for the data flow, wherein the command is a complementary command executed in addition to the stored routing instructions. Providing for complementary commands allows for implementation of a large number of accounting and other functions that may not directly affect data packet routing.

Optionally, in any of the preceding aspects, another implementation of the aspect includes, further comprising memory storing routing instructions for the data flow, wherein the command is an override command executed instead of the stored routing instructions. Providing for override commands allows for implementation of in-band functions that dynamically change packet/flow handling based on current in conditions in the network.

Optionally, in any of the preceding aspects, another implementation of the aspect includes, wherein the conditional command instructs the network device to modify a resource allocation for the data flow, modify a chosen next hop for the data flow, or update a flow context for the data flow upon occurrence of the condition.

Optionally, in any of the preceding aspects, another implementation of the aspect includes, wherein the conditional command instructs the network device to modify data in the data packet, modify a chosen next hop for the data packet, modify a priority for the data packet, drop the data packet, buffer the data packet, or modify metadata in the data packet upon occurrence of the condition.

Optionally, in any of the preceding aspects, another implementation of the aspect includes, wherein determining that the condition is satisfied includes parsing data from the data packet, checking a flow context of the data flow, checking a state of the network device, comparing data items, or checking an identity of the network device.

In another embodiment, the disclosure includes a method comprising: receiving, at a receiver in a network device, a data flow including a data packet, the data packet including a conditional command; obtaining, by a processor in the network device, a condition and a command from the conditional command; determining, by the processor, that the condition is satisfied; and based on the determination that the condition is satisfied, executing, by the processor, the command to alter handling of the data flow, alter handling of the data packet, or alter a flow context for the data flow. By including conditional commands in the data packet, a source node can control how a data flow and/or how particular packets are handled when traversing a network upon the occurrence of the condition(s). Hence, conditional commands allow for in-band control of network functions, where in-band indicates that control information is forwarded in the same channel as the communicated data.

Optionally, in any of the preceding aspects, another implementation of the aspect includes, wherein the conditional command further includes one or more command parameters, the command parameters containing data indicating a value that defines a set of operation conditions for the command. Including command parameters into the conditional command allows the commands to be customized, and hence provide greater in-band control of nodes along a flow path.

Optionally, in any of the preceding aspects, another implementation of the aspect includes, wherein the conditional command further includes a condition parameter, the condition parameter containing data indicating a value to support evaluation of the condition. Including conditional parameters into the conditional command allows the conditions to be customized, and hence provide greater in-band control of nodes along a flow path.

Optionally, in any of the preceding aspects, another implementation of the aspect includes, wherein the conditional command further includes a global parameter, the global parameter containing data indicating a value to support evaluation of all conditional commands in a header of the data packet or to support consuming information associated with the global parameter.

Optionally, in any of the preceding aspects, another implementation of the aspect includes, wherein the conditional command instructs the processor to modify a resource allocation for the data flow, modify a chosen next hop for the data flow, or update a flow context for the data flow upon occurrence of the condition.

Optionally, in any of the preceding aspects, another implementation of the aspect includes, wherein the conditional command instructs the processor to modify data in the data packet, modify a chosen next hop for the data packet, modify a priority for the data packet, drop the data packet, buffer the data packet, or modify metadata in the data packet upon occurrence of the condition.

Optionally, in any of the preceding aspects, another implementation of the aspect includes, wherein determining that the condition is satisfied includes parsing data from the data packet, checking a flow context of the data flow, checking a state of the network device, comparing data items, or checking an identity of the network device.

In another embodiment, the disclosure includes a non-transitory computer readable medium comprising a computer program product for use by a network device, the computer program product comprising computer executable instructions stored on the non-transitory computer readable medium such that when executed by a processor cause the network device to: receive a data flow including a data packet, the data packet including a conditional command; obtain a condition and a command from the conditional command; determine that the condition is satisfied; and based on the determination that the condition is satisfied, execute the command to alter handling of the data flow, alter handling of the data packet, or alter a flow context for the data flow. By including conditional commands in the data packet, a source node can control how a data flow and/or how particular packets are handled when traversing a network upon the occurrence of the condition(s). Hence, conditional commands allow for in-band control of network functions, where in-band indicates that control information is forwarded in the same channel as the communicated data.

Optionally, in any of the preceding aspects, another implementation of the aspect includes, wherein the conditional command instructs the network device to modify a resource allocation for the data flow, modify a chosen next hop for the data flow, or update a flow context for the data flow upon occurrence of the condition.

Optionally, in any of the preceding aspects, another implementation of the aspect includes, wherein the conditional command instructs the network device to modify data in the data packet, modify a chosen next hop for the data packet, modify a priority for the data packet, drop the data packet, buffer the data packet, or modify metadata in the data packet upon occurrence of the condition.

Optionally, in any of the preceding aspects, another implementation of the aspect includes, wherein determining that the condition is satisfied includes parsing data from the data packet, checking a flow context of the data flow, checking a state of the network device, comparing data items, or checking an identity of the network device.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
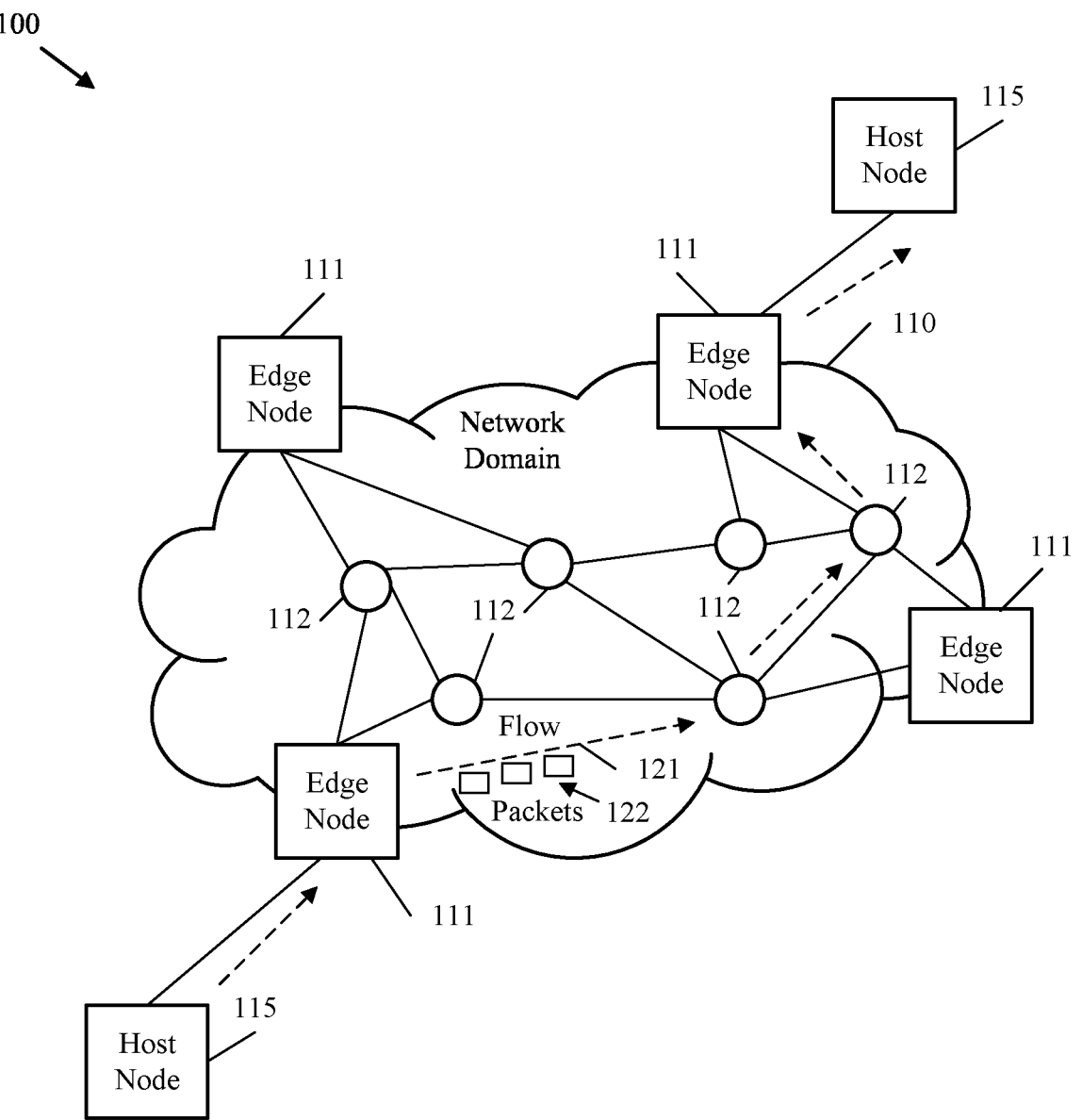
FIG. 1 is a schematic diagram of an example network for routing data packets with conditional commands.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Application goals are generally introduced either through network forwarding policies enforced on network nodes to indicate where packets should be forwarded, when packets should be dropped, how packets should be prioritized, etc. In such a case, data packets are treated according to the discretion of the node handling the packet. Further, in some cases network nodes may employ source routing to allow a head-end node to decide to select a particular network path for a data flow. Instead of letting nodes make the forwarding decisions, source routing allows the head-end node to determine the path the packet should take and encode the path in the packet. However, source routing may be generally static and inflexible with respect to conditions such as eliminating traffic congestion, path outage etc. and may be unable to take dynamic conditions into account. In such networks, software defined network (SDN) based technologies are employed to allow a controller to modify network policies on a per flow basis. However, the time scales of control loops may be too long to allow for adaptations at line rate as packets of flows cross the network. Further, such systems can make changes at the flow level, but not for specific packets. In either case, application goals are generally introduced to the network via hard coded protocols or external control logic which are immensely time consuming to create and deploy.

Disclosed herein are mechanisms to implement self-driving packets that employ conditional commands. A data packet includes a header that holds routing information and a payload that holds the communicated data. The conditional commands are inserted in, or attached to, the header and outside the packet payload (e.g., in the header and/or between the header and the payload). Hence, the conditional commands can be read without employing DPI and without decrypting the packet payload. The conditional commands can be included in the data packet at the source node into the network domain and employed by other network nodes traversed by the packet. The conditional commands may also be included in the data packet by a network node in some cases. A conditional command includes a condition and a command. The condition indicates an item that must be satisfied before the command is executed. When the condition is not met, the command is ignored. The command indicates an action or set of actions to be taken by the node processing the data packet upon occurrence of the condition. The conditional command may also include condition parameters, command parameters, and/or common/shared parameters. Such parameters include data that modify the outcome of the assessment of the condition and/or modify the command at the processing nodes. By including conditional commands in the data packet header, the source node can control how the data flow and/or how particular packets are handled when traversing the network upon the occurrence of the condition(s). Hence, conditional commands allow for in-band control of network functions, where in-band indicates that control information is forwarded in the same channel as the communicated data. For security reasons, such conditional commands may be limited in scope to corresponding data flows, corresponding sub-flows, and/or corresponding packets.

For example, conditions assess (e.g., compare) the status of an item at a node communicating the data packet. Such conditions may include a property of the data packet itself (e.g. the packet length), a context of the data flow (e.g. a packet counter or a service level objective for the flow), a state of the network device (e.g., the depth of the egress queue at a router), and/or other node conditions (e.g., node address). The commands indicate how a data packet and/or a corresponding data flow should be treated by the node upon occurrence of the condition. For example, the command may alter packet routing (e.g., drop packet, queue packet, change packet priority, change next hop), alter packet header contents or BPP block contents (e.g., add/ change metadata, add/change packet header data, swap header field with meta data field, increment packet counters), change resource allocations at the node (e.g., update flow context, update flow priority/routing), execute custom functions at the node, change node states, etc. Flow context, as used herein, may refer to a flow cache, flow cache reservations, a flow state, flow metadata, such as a presence of flow cache entry, a value of a data field in a corresponding flow cache entry such as a number of packets, and a router state such as a queue occupancy level. However, the commands may not alter the data in the packet payload (e.g., user data). Parameters can then add variables or other contextual information to support interpretation of the conditions and/ or commands. Accordingly, conditional commands provide control of a wide range of network functionality that can be customized to achieve application goals without interfering with network function relative to unrelated data flows. Further, conditional commands allow network functionality to be changed dynamically while data packets are in transit through the network and not based solely on network traffic projections. As a particular example, a data packet may be dropped in transit upon determination that latency is too great, which may allow the data packet to be discarded immediately instead of using network resources only to be discarded at the destination. As another example, a counter in the data packet may be incremented for each node along the path with resource usage in excess of a specified amount. This may allow verification that quality of service (QoS) guarantees are met in real time. As another example, a data flow/data packet can be re-routed and/or re-prioritized based on actual available bandwidth, latency, etc. along a path.

Hence, the present disclosure provides end-point devices, head-end devices, and applications greater control over how packets are processed by nodes in a network domain. This in turn enables the creation of customized network solutions that provide improved network services. Such services may be more resilient, more flexible, better performing, provide improved guarantees, and provide for increased ease of operation over other network technologies. Further, the present disclosure provides a mechanism for optionally employing such functionality in combination with centralized components, such as network controllers. Implementation details for conditional command usage are discussed in greater detail with respect to the FIGS. below.

FIG. 1 is a schematic diagram of an example network 100 for routing data packets 122 with conditional commands. The network 100 includes a network domain 110 coupling host nodes 115. The network domain 100 includes edge nodes 111 that act as ingress and egress points and internal nodes 112 that communicate data, such as a data flow 121 of data packets 122.

Host nodes 115 are nodes that operate applications and wish to communicate. Such host nodes 115 may communicate by transmitting data flows 121 via a network domain 110. A data flow 121 is a group of related communications between a common set of end points, such as host nodes 115. For example, applications operating on the host nodes 115 can initiate a communication session. The data exchanged during the communication session may be transmitted as a data flow 121. The data in the data flow 121 is separated into data packets 122 for transmission. A data packet 122 includes a header with routing information and a payload with the data exchanged between the host nodes 115 (e.g., as part of the communication session.) The payload may be encrypted in some cases, and may not be readable by the network domain 110 connecting the host nodes 115.

A network domain 110 is group of interconnected network components controlled by a common set of networking policies. It should be noted that, while network domain 110 is a single domain, the present disclosure may be deployed in a multi-domain context. The edge nodes 111 are network devices capable of converting packets 122 into a form that complies with the policies of the network domain 110. For example, the edge nodes 111 may implement security policies for the network domain 110, change data packet 122 network addresses according to network domain 110 addressing schemes, manage the path data packet 122/flow 121 traverses through the network domain 110, etc. Hence, the edge nodes 111 act as ingress and egress points into the network domain 110. As a particular example, the edge nodes 111 may determine path(s) across the network domain 110, encapsulate the packets 122 to cause the packets 122 to proceed through the network domain 110 via tunnels, etc. The edge nodes 111 are interconnected by a series of internal nodes 112 and corresponding links, depicted as lines. The internal nodes 112 are network devices, such as routers, that are configured to read data packet 122 header information and forward the data packets 122 according to the header information. The edge nodes 111 and/or the internal nodes 112 may identify flows 121 and determine that packets 122 and corresponding context information are associated with a corresponding flow 121. For example, a packet 122/flow 121 can be identified by a tuple containing several key parameters, such as source Internet Protocol (IP) address and source port, destination IP address and destination port, Type of Service (ToS), input interface, etc. In other cases, packet 122/flow 121 can be identified by a flow specifier. The edge nodes 111 and the internal nodes 112 may also contain flow caches which maintain context information related to the data flow 121. For example, a flow cache may contain a flow cache entry associated with each data flow 121 and/or a group of aggregated flows 121 traversing the node containing the flow cache. The flow cache entry may contain data flow 121 duration information, start time, a source address, a destination address, a number of packets 122 transmitted, an amount of data transmitted in the flow, and/or other data flow 121 related stat information.

The network domain 110 can be modified to employ conditional commands for routing the data packets 122. Such conditional commands may also be employed to manage other flow 121 related actions, such as updating flow 121 context, directing maintenance of statistics related to the flow 121, updating packet 122 metadata/header, etc. Hence, the conditional commands allow the packets 122 to direct how the packets 122 should be routed (e.g., self-driving) and/or how the flow 121 should be managed instead of relying on network policies at the internal nodes 112 and/or edge nodes 111. A conditional command is positioned in the packet 122 header by the edge node 111 acting as an ingress node (e.g., the head-end node). The conditional command includes a condition, a command, and may also include one or more parameters. The condition indicates an item that must be satisfied before the command is executed. When the condition is not met, the command is ignored. The command indicates an action or actions to be taken by the node processing the data packet 122 upon occurrence of the condition.

In one example, the host node(s) 115 may communicate with the edge node(s) 111 to setup a communication. The host nodes(s) 115 may express the application's communication goals to the edge node(s) 111. The ingress edge node 111 can then generate a conditional command based on the application's communication goals and append the conditional command on the data packets 122 of the data flow 121 as such packets 122 enter the network domain 110. In another example, a network provider may determine to inject conditional commands into the data packets 122 at the edge node(s) 111 without a request from the host node(s) 115. For example, the network provider may determine to add conditional commands for general network domain 110 maintenance purposes and/or to achieve some goal obtained from other channels, such as from a controller or an Operations Support System (OSS).

The internal nodes 112 obtain the conditional commands from the packets 122 during routing. The internal nodes 112 may store routing instructions for the data flow 121. Such routing instructions may include flow 121 specific data in a flow cache and/or general routing instructions, such as network domain 110 policies, IP routing instructions, media access control (MAC) routing instructions, multiprotocol label switching (MPLS) instructions, and/or other routing instructions commonly employed for routing packets 122 via a network. When the condition(s) for the conditional command(s) are met, the internal nodes 112 can execute the associated command(s). Such commands may be complementary commands that are executed in addition to the stored routing instructions (e.g., update flow context, change data packet header data, etc.) In other cases, the commands may be override commands that are executed instead of the stored routing instructions (e.g., drop packet, change next hop, etc.)

The internal nodes 112 may also obtain parameters from the conditional commands. The parameters provide data to clarify the condition(s), the command(s), or both. For example, a condition may include a comparison, such as less than, greater than, equal to, prefix of, etc. A condition parameter may then contain data indicating a value to support evaluation of the condition. For example, the condition parameter may indicate what value is being compared (e.g. a threshold value to compare an item against or a specific data item to compare against), such as node address is compared to X, data packet 122 field (e.g., time to live (TTL) field, next hop prefix, etc.) is compared to X, Transmission Control Protocol (TCP) Keep alive is compared to X, flow cache entry is compared to X, queue occupancy is compared to X, etc., where X is a variable set upon creation of the conditional command. X may be set to include many items, such as a data value, reference to a piece of metadata/data carried in the packet 122 and/or a packet header field, a reference to a piece of metadata related to the flow 121 that is maintained in state on a node 111/112 outside the packet 122, a reference to a well-defined data item, such as an interface stats parameter, etc. The condition and the conditional parameter allow the internal nodes 112 to check a wide range of definable conditions, such as properties of the data packet 122 carrying the conditional command, data flow context, internal node 112 router state, data packet 122 upper layer information (e.g., Open Systems Interconnection (OSI) model layer four and above), node conditions, etc. It should be noted that a condition could be set to always evaluate to true in order to cause the command to execute at each internal node 112 that routes the packet 122. Otherwise, the condition is set to trigger the command only upon the occurrence of the situation desired by the egress edge node 111.

As another example, the command(s) include one or more primitives that are to be applied upon occurrence of the condition. A primitive is a function that is understood by the internal node 112. A command parameter contains data indicating a value that defines a set of operation conditions for the command. For example, the command parameter may indicate what item should be acted upon by the command and/or the extent to which the item should be acted upon/changed. For example, the command may initiate functions at the internal nodes 112 such as, packet 122 drop, packet 122 queue, packet 122 priority, update packet 122 field (e.g., mark, add, swap, replace, increment, and/or update field), update flow 121 context, update packet 122 metadata (e.g., mark, add, swap, replace, increment, and/or update metadata), set packet 122/flow 121 next hop, allocate internal node 112 resource, initiate custom function, etc. The command parameter may then indicate which packet 122 queue to employ, which packet 122 priority to employ, which field to update, and what value to place in such field, etc. As a specific example, a command may indicate that a resource should be allocated at the internal node 112, and parameters may indicate the requested resource type, the resource qualification (e.g., size/amount of allocation), the duration of allocation, etc. Hence, the command and the command parameter allow the internal nodes 112 to execute a wide range of functions. By executing the command upon occurrence of the condition, a wide range of sophisticated actions can be taken by the internal nodes 112 without prior programming that is particular to the flow 121. For example, an internal node 112 could raise/lower packet 122/flow 121 priority in response to network traffic, preemptively drop packets 122 with high latency, change packet 122/flow 121 routing paths in response to network traffic, update, and/or swap packet 122 counter(s)/fields/metadata to provide insight as to conditions at internal nodes 112 along the path, etc. Further, global parameters may also be employed that contain data indicating a value that is global to the packet 122 header. Hence, a global command may affect both the condition and the command as desired.

After being forwarded across the network domain 110, the packets 122 are received by an edge node 111 acting as an egress node for the flow 121. The edge node 111 can remove and/or process the conditional commands before forwarding the packets 122 to the host node 115 at the flow 121 destination. For example, the edge node 111 can read the header fields and/or metadata in the data packets 122. The edge node 111 may also report results to the host node(s) 115. For example, the edge node 111 may send reports including data from several packets 122 to indicate that the network domain 110 has complied with service level agreements (SLA). As another example, the edge node 111 may communicate in real time when the SLA has been breached.

As can be seen by the above disclosure, conditional commands allow for a broad range of functionality to be implemented by a network domain 110 based on in-band signaling that can be tailored on a per flow 121 and/or even on a per packet 122 basis. Accordingly, conditional commands provide for significant improvement of the functionality, flexibility, and efficiency of the network domain 110. It should also be noted that while an OSI layer three point to point network (e.g., IP network) is shown, conditional commands can be implemented in other network types, such as OSI layer two networks, SDNs, MPLS networks, etc. The following FIGS. disclose example devices and encoding schemes that may be employed to encode and/or process conditional commands as discussed hereinabove.

Figure 2:
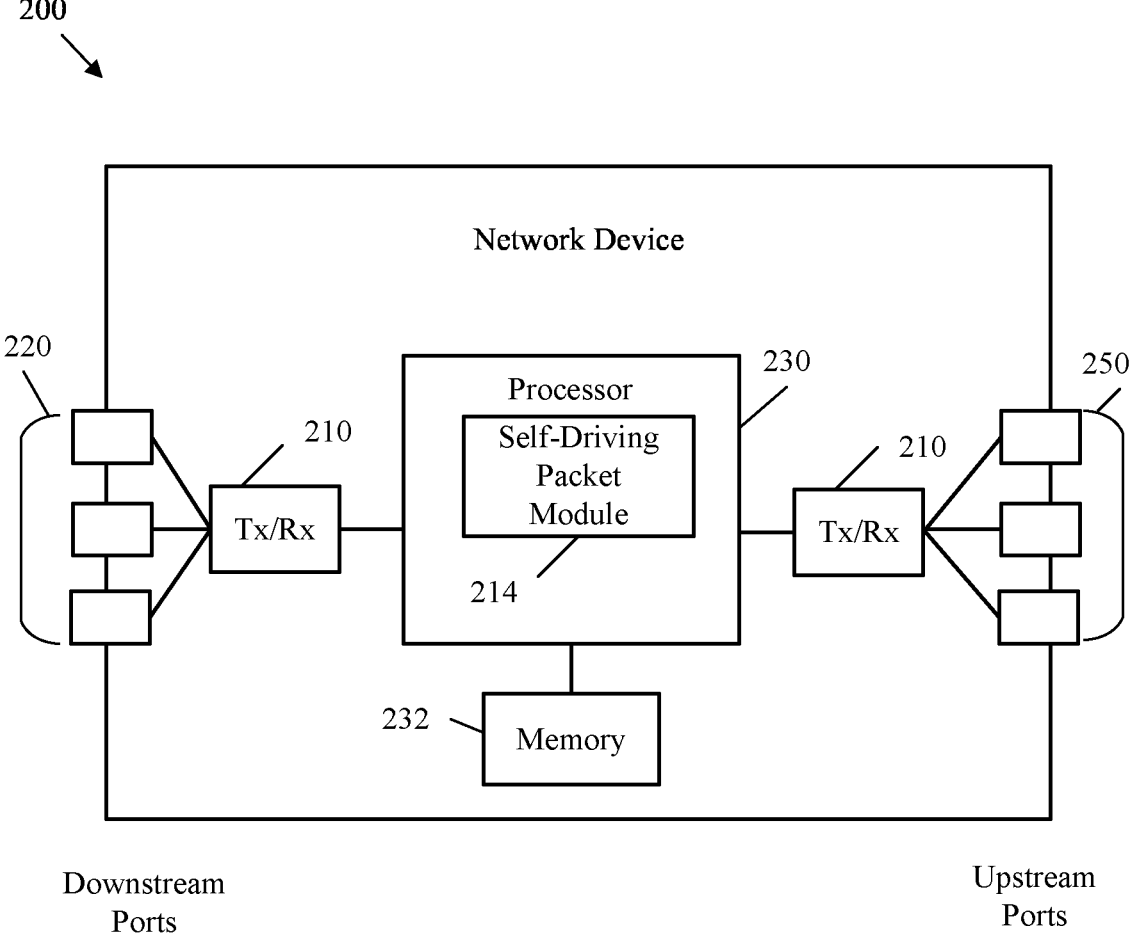
FIG. 2 is a schematic diagram of an example network device for executing conditional commands obtained from network packets.

FIG. 2 is a schematic diagram of an example network device 200 for executing conditional commands obtained from network packets, such as data packets 122 as part of a data flow 121. For example, network device 200 may implement an edge node 111 and/or an internal node 112 in a network domain 110. Further, the network device 200 can be configured to implement method 700 as well as other methods/mechanisms disclosed herein. For example, the network device 200 can transmit data packets with a data packet header 300 or a data packet header 400 containing a conditional command block 500. Such headers can be implemented in a BPP header 600. Such items are discussed in more detail with respect to the FIGS. below.

Accordingly, the network device 200 may be configured to implement or support the schemes/features/methods described herein. For instance, the features/methods in the disclosure may be implemented using hardware, firmware, and/or software installed to run on hardware. One skilled in the art will recognize that the term network device encompasses a broad range of devices of which network device 200 is merely an example. Network device 200 is included for purposes of clarity of discussion, but is in no way meant to limit the application of the present disclosure to a particular network device embodiment or class of network device embodiments.

The network device 200 may be a device that communicates electrical and/or optical signals through a network, e.g., a switch, router, bridge, gateway, etc. As shown in FIG. 2, the network device 200 may comprise transceivers (Tx/Rx) 210, which may be transmitters, receivers, or combinations thereof. A Tx/Rx 210 may be coupled to a plurality of downstream ports 220 (e.g., downstream interfaces) for transmitting and/or receiving frames from other nodes and a Tx/Rx 210 coupled to a plurality of upstream ports 250 (e.g., upstream interfaces) for transmitting and/or receiving frames from other nodes, respectively. A processor 230 may be coupled to the Tx/Rxs 210 to process the data signals and/or determine which nodes to send data signals to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). The network device 200 may comprise a self-driving packet module 214, which may be configured to receive data packets. The self-driving packet module 214 can then obtain a conditional command from a data packet, and determine whether a condition in the conditional command is satisfied based on packet header data, network device 200 state, and/or based on associated parameters in the conditional command. Upon determining that the condition is satisfied, the self-driving packet module 214 can execute the command from the conditional command, for example based on corresponding parameters stored in the conditional command. Such a command may cause the self-driving packet module 214 to modify packet data, flow context, routing instructions, network device 200, and/or perform other actions to the data packet and/or the corresponding flow. The self-driving packet module 214 may be implemented in a general purpose processor, a field programmable gate array (FPGA), an ASIC (fixed/programmable), a network processor unit (NPU), a DSP, a microcontroller, etc. In alternative embodiments, the self-driving packet module 214 may be implemented in processor 230, as instructions stored in memory device 232 (e.g., as a computer program product), which may be executed by processor 230, and/or implemented in part in the processor 230 and in part in the memory device 232. The downstream ports 220 and/or upstream ports 250 may contain wireless, electrical and/or optical transmitting and/or receiving components, depending on the embodiment.

Figure 3:
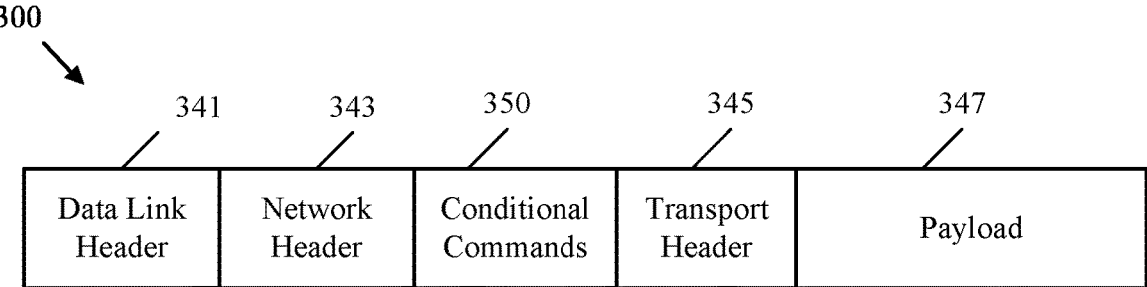
FIG. 3 is a schematic diagram of an example data packet header containing conditional commands.

FIG. 3 is a schematic diagram of an example data packet header 300 containing conditional commands. For example, data packet header 300 can be employed to carry conditional commands in a data packet 122 in a data flow 121. The data packet header 300 includes a data link header 341, a network header 343, a conditional commands block 350, a transport header 345, and a payload 347. The data link header 341 may include OSI model layer two information, such as a MAC source and/or destination addresses, switching/tunneling data, local area network (LAN) data, virtual local area network (VLAN) tags, and/or other information employed to switch a data packet/frame through a network. The network header 343 may include OSI model layer three information, such as IP source/destination addresses, security data, and/or other data related to network routing protocols operating in the network layer. The transport header 345 contains data related to connections, flow control, congestion avoidance data, packet order data, and/or other data related to network routing protocols operating in the transport layer. The payload 347 contains the data communicated from application(s) operating at the data packet source to application(s) operating at the data packet destination.

The conditional commands block 350 is encoded between the network header 343 and the transport header 345. The conditional commands block 350 contains one or more conditions and one or more associated commands. The conditional commands block 350 may also contain parameters for the conditions(s), parameters for the command(s), global parameters related to both, or combinations thereof. The conditional commands in the conditional commands block 350 are interpreted and acted upon by hops (e.g., routers/nodes) along the network path. Such conditional commands provide guidance to the nodes along the path in the form of specific directives (commands) for how the nodes should handle the packet along with conditions to indicate when the commands should be implemented. Accordingly, a node along a path can obtain condition(s), command(s), and/or parameters form the conditional commands block 350. The node can then make changes to the node state, node resource allocation, packet data, packet routing, and/or flow management by executing the command(s) when the condition(s) are met.

Figure 4:
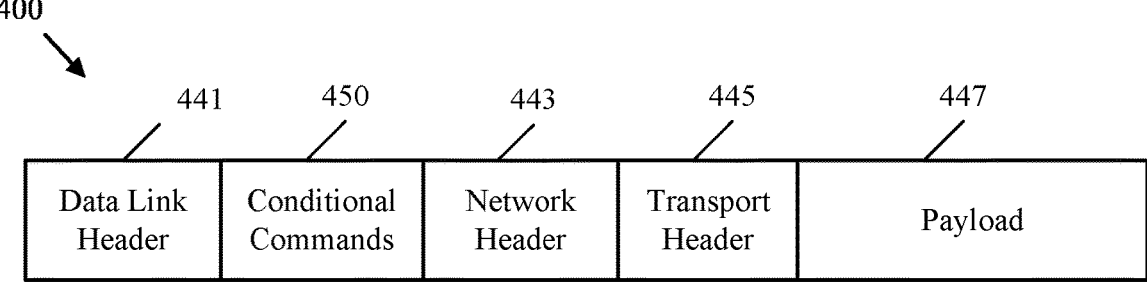
FIG. 4 is a schematic diagram of another example data packet header containing conditional commands.

FIG. 4 is a schematic diagram of another example data packet header 400 containing conditional commands. For example, data packet header 400 can be employed to carry conditional commands in a data packet 122 in a data flow 121. The data packet header 400 includes a data link header 441, a network header 443, a conditional commands block 450, a transport header 445, and a payload 447, which are substantially similar to the data link header 341, the network header 343, the conditional commands block 350, the transport header 345, and the payload 347, respectively. Unlike data packet header 300, the conditional commands block 450 is encoded between the data link header 441 and the network header 443.

Encoding of the data packet header 300/400 can occur in a number of ways. For example instructions can be assigned a specified code (e.g., by selecting from a set of instructions known to the network nodes). Conditions can be encoded as a structure that includes the type of condition (e.g., a comparator—equals, greater than, less than, exists, match substring, etc.), and the items that are being compared (e.g., using a category/subcategory encoding). The category may include a packet field, a flow context, and/or a router state. The sub-category may include an egress utilization, an egress number of drops, a central processing unit (CPU) utilization, a memory utilization, etc. Such encodings can be type length value (TLV) based. The parameters can be encoded per TLV and referred to by instructions and conditions in terms of the parameter position. The following FIG. depicts one possible structure for the encoding. It should be noted that other structures and other encodings could also be employed.

Figure 5:
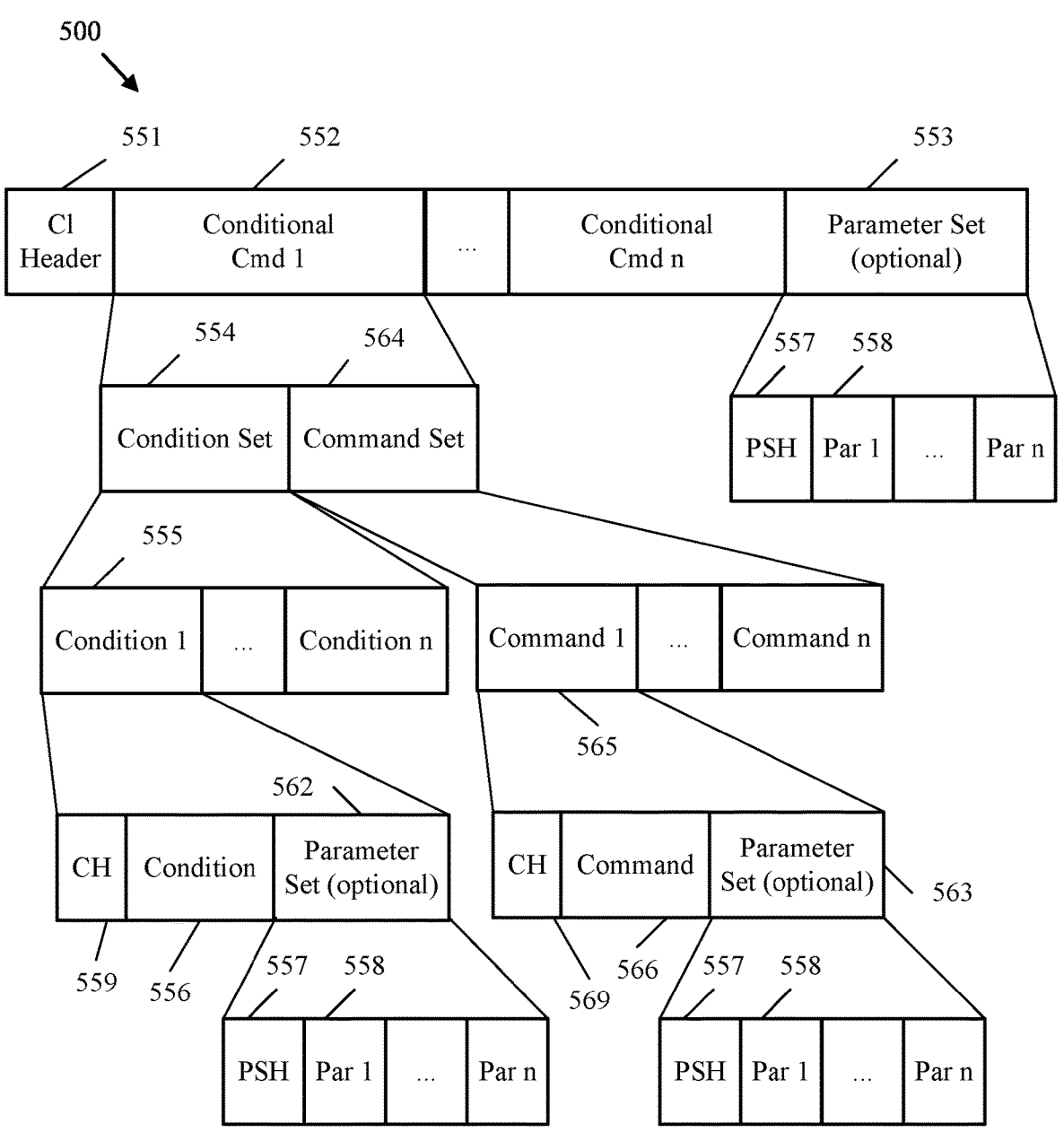
FIG. 5 is a schematic diagram of an example conditional command block for use in a data packet header.

FIG. 5 is a schematic diagram of an example conditional command block 500 for use in a data packet header, such as data packet header 300 and/or 400, contained in a data packet 122 in a data flow 121. For example, command block 500 may be employed to implement a conditional commands block 350 and/or 450.

The conditional command block 500 contains a conditional instruction set header 551, one or more conditional commands fields 552, and may contain a global parameter set field 553. The conditional instruction set header 551 is a block of data that indicates the presence of conditional command block 500 as well as associated administrative data, such as conditional command block 500 length, number and size of conditional instructions, number and size of the parameter set(s), error checking data, version data, flags related to the entire conditional command block 500, etc. The conditional commands field(s) 552 contains one or more conditional commands (e.g., 1-n, where n is any integer value). The conditional instruction set contained in the conditional commands field(s) 552 may be encoded in any order as execution of conditional instructions may not be sensitive to order and may even occur in parallel. The global parameter set field 553, when present, contains parameters that are relevant to both conditions and commands and/or relevant to multiple conditional commands, depending on the example.

The conditional commands field 552 contains a condition set field 554 and a command set field 564. The condition set field 554 contains one or more condition fields 555 (e.g., 1-n where n is any integer value) related to the corresponding conditional commands field 552. Such condition fields 555 may be included in any order. The command set field 564 contains one or more command fields 565 (e.g., 1-n where n is any integer value) related to the corresponding conditional commands field 552. Accordingly, when the condition field(s) 555 are met, the corresponding command field(s) 565 are scheduled for execution. Complex conditions and commands can be implemented by employing multiple conditions (e.g., conditions depending on conditions) and/or commands (e.g., commands depending on commands) in the condition set field 554 and the command set field 564, respectively.

A condition field 555 includes a condition header 559, condition data 556, and optionally a condition parameter set 562. The condition header 559 may contain data indicating the presence of a following condition, a condition number/length, and/or a Boolean operation to be applied to the set of conditions (e.g., and vs or where and is applied by default). The condition data 556 contains data indicating which condition is contained in the condition field 555. Such conditions may include a comparison, such as less than, greater than, equal to, prefix of, etc. Such conditions may relate to a property of the data packet containing the conditional command block 500, a context of the data flow, a state of the network device processing the data packet, and/or other node conditions. Some conditions may be checked without additional information. However, when additional information is desirable to provide context for the conditions in the condition data 556, a condition parameter set 562 is also included. The condition parameter set 562 relates to the condition in the corresponding condition data 556, and may be encoded as a TLV. The condition parameter set 562 may contain a parameter set header 557, which may contain data indicating the presence of a following set of parameters, a parameter set length, and/or related flags. The condition parameter set 562 may also contain a set of one or more parameter data fields 558 that contain data indicating the relevant parameter(s) related to the corresponding condition denoted by the condition data 556. For example. the parameter data fields 558 may be set to include many items, such as a data value, reference to a piece of metadata/data carried in the packet and/or a packet header field, a reference to a piece of metadata related to the flow that is maintained in state on a node outside the packet, a reference to a well-defined data item, such as an interface stats parameter, etc. Accordingly, the condition parameter data fields 558 may contain data indicating a value to support evaluation of the condition denoted by the condition data 556. Examples of conditions that may be represented by condition data 556 and condition parameter set 562 may include a comparison relative to a property of a header of a data packet (e.g., a value of TTL field, a value of a Differentiated Services Code Point (DSCP) field, a next hop prefix, etc.), a flow context (e.g., a presence of flow cache entry, a value of a data field in a corresponding flow cache entry such as a number of packets), a router state (e.g., a queue occupancy level), a utilization of an interface such as an ingress interface through which the packet entered the node or the presumed egress interface), upper-layer information (e.g., a three way handshake of TCP connections, a TCP keep alive), and/or node conditions (e.g., a node address in order to execute instructions at a specific node).

A command field 565 includes a command header 569, command data 566, and optionally a command parameter set 563. The command header 569 may contain data indicating the presence of a following command, a command number/length, and/or a Boolean operation to be applied to the set of commands. The command data 566 contains data indicating which command is contained in the command field 565. Such commands may include commands that are complementary commands that are executed in addition to routing instructions stored at the node. Such commands may also include override commands that are executed instead of the stored routing instructions. The commands may indicate how the node should treat the data packet (e.g., drop, queue, buffer, prioritize), indicate the node should perform a custom function (e.g., classify), indicate the node should update packet contents (e.g., mark, add/update block parameter), indicate the node should update flow context (e.g., write data item), and/or indicate that the node should use specified next hop for the packet/flow. The commands in the command data 566 may also include primitives that act on the node. For example, the commands may direct the node to allocate a resource (e.g., parameters include requested resource type, resource qualification/sizing, duration), act on packet header fields (e.g., swap header field with metadata item), and/or act on metadata carried in the packet (e.g., add a metadata item, replace a metadata item, increment a metadata value). Some commands may be checked without additional information. However, when additional information is desirable to provide context for the command in the command data 566, a command parameter set 563 is also included. The command parameter set 563 may be substantially similar to the condition parameter set 562, but may contain data indicating a value that defines a set of operation conditions for the command in the command data 566.

The global parameter set field 553 may be substantially similar to the condition parameter set 562 and/or the command parameter set 563. However, the global parameter set field 553 may contain data indicating a value that defines a set of operation conditions for the entire conditional command and/or all of the conditional commands in contained in the conditional commands field 552 and/or to support consuming information associated with the global parameter, such as storing data in a flow context.

For example, the conditional command block 500 can be employed to instruct the network node processing the data packet to modify a resource allocation for the data flow, modify a next hop for the data flow, and/or update a flow context for the data flow upon occurrence of the condition. For example, a next hop may chosen based on the destination address of the packet and based on the local routing table, which is programmed through various control plane protocols. The conditional command block 500 can be employed to modify such a chosen next hop. As another example, the conditional command block 500 can be employed to instruct the network node processing the data packet to modify data in the data packet, modify a next hop for the data packet, modify a priority for the data packet, drop the data packet, buffer the data packet, or modify metadata in the data packet upon occurrence of the condition. As yet another example, the conditional command block 500 can be employed to instruct the network node processing the data packet to execute such commands upon determining that a condition is satisfied by parsing data from the data packet, checking a flow context of the data flow, checking a state of the network device, comparing data items, and/or checking an identity of the network device.

Figure 6:
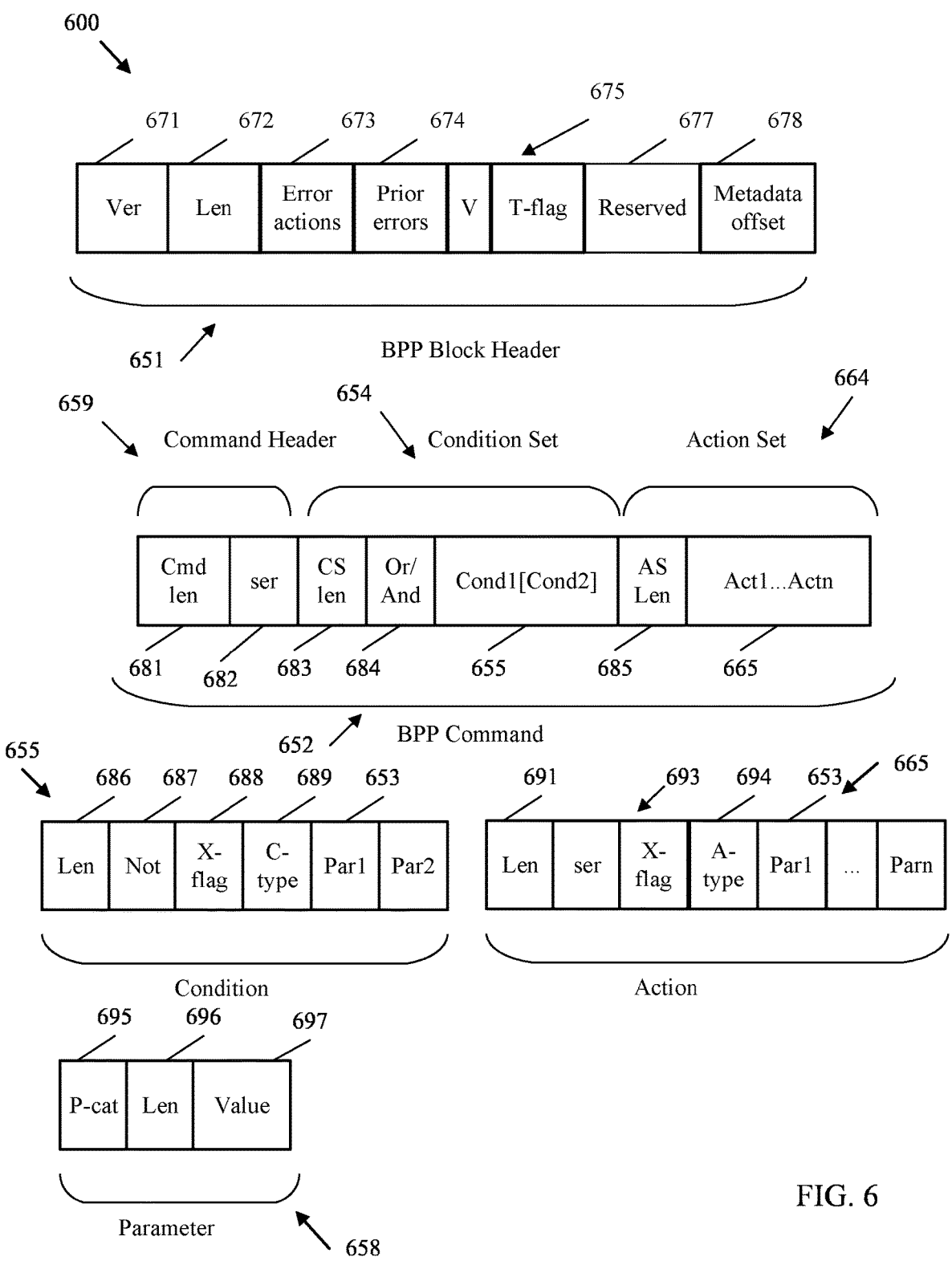
FIG. 6 is a schematic diagram of an example Big Packet Protocol (BPP) header that can be employed to implement a conditional command block.

FIG. 6 is a schematic diagram of an example Big Packet Protocol (BPP) header 600 that can be employed to implement a conditional command block, such as a conditional command block 500 used in a data packet header, such as data packet header 300 and/or 400, contained in a data packet 122 in a data flow 121. For example, BPP header 600 may be employed as a specific implementation of a conditional command block 500. It should be noted that the BPP header 600 fields are subject to change due to standardization, and the disclosed field structure is shown to illustrate the concepts included herein. As such, the BPP header 600 fields should not be considered limiting.

BPP header 600 includes a BPP block header 651 that may be employed to implement a conditional instruction set header 551. The BPP header 600 also includes a BPP command 652 with a command header 659, a condition set 654, and an action set 664 that can be employed to implement conditional commands field 552, a condition header 559/command header 569, a condition set field 554, and a command set field 564, respectively. BPP header 600 may also include one or more parameters 658 that may implement parameter data fields 558.

The BPP block header 651 may include a version field 671 that contains version information for the BPP header 600. The BPP block header 651 may also include a length field 672 that indicates a total length (e.g., in bits) of the BPP header 600. The BPP block header 651 may also include an error actions field 673 that indicates actions to be taken in case of an error. Such actions may include an action to drop the packet, an action to ignore all conditional commands and revert to general processing, an action to ignore the fact that an error has occurred and attempt to continue performing all commands as if nothing has happened, etc. The BPP block header 651 may also include a prior errors field 674 that may contain data indicating previous errors occurring at previous nodes along the path. The BPP block header 651 may also include flags 675 containing other administrative data relevant to the BPP header 600. The BPP block header 651 may also contain reserved 677 bits that are set aside for possible future extensions. The BPP block header 651 may also contain a metadata offset field 678 that indicates a number of bits between the BPP block header 651 and the beginning of metadata encodings.

The command header 659 may contain a command length field 681 that indicates the length of the set of conditional commands and/or parameters in the BPP command 652. The command header 659 may also contain various flags 682 containing other administrative data relevant to the BPP command 652.

The condition set 654 may contain a condition set length field 683 that indicates the length and/or number of conditions. The condition set 654 may also contain an and/or field 684 to indicate whether the conditions should all be satisfied to initiate the commands (and) or whether the commands should be initiated when any condition is satisfied (or). The condition set 654 also contains one or more conditions 655. The conditions 655 may include a length field 686 indicating the length of the condition in bits. The conditions 655 may also include a not field 687, which may indicate a default Boolean condition. The conditions 655 may also include various flags 688 to further clarify/modify the condition. The conditions 655 may also include a condition type field 689 to indicate the condition to be employed. The conditions 655 may also include one or more parameters 653 to describe the conditions. The parameters 653 may include a parameter category field 695, a length field 696, and a value field 697 indicating the category of the parameter, the length of the parameter, and the value of the parameter, respectively, in TLV format. It should be noted that the condition set 654 structure disclosed herein is maintained in TLV format to allow use in conjunction with various metadata parameters under standardization by the Internet Engineering Task Force (IETF), such as Service Function Chaining (SFC) parameters, Network Service Header (NSH) parameters, IP Performance Measurement (IPPM) parameters, In-situ Operations, Administration, and Management (IOAM) parameters, etc.

The action set 664 may contain an action set length field 685 that indicates the length and/or number of commands. The action set 664 may also contain one or more actions 665 (e.g., commands). An action 665 may contain a length field 691 to indicate the length of the action 665. An action 665 may also contain various flags 693 to further clarify/modify the command. The action 665 may also contain an action type field 694 indicating the command. The action 665 may also include one or more parameters 653 to describe the commands.

Figure 7:
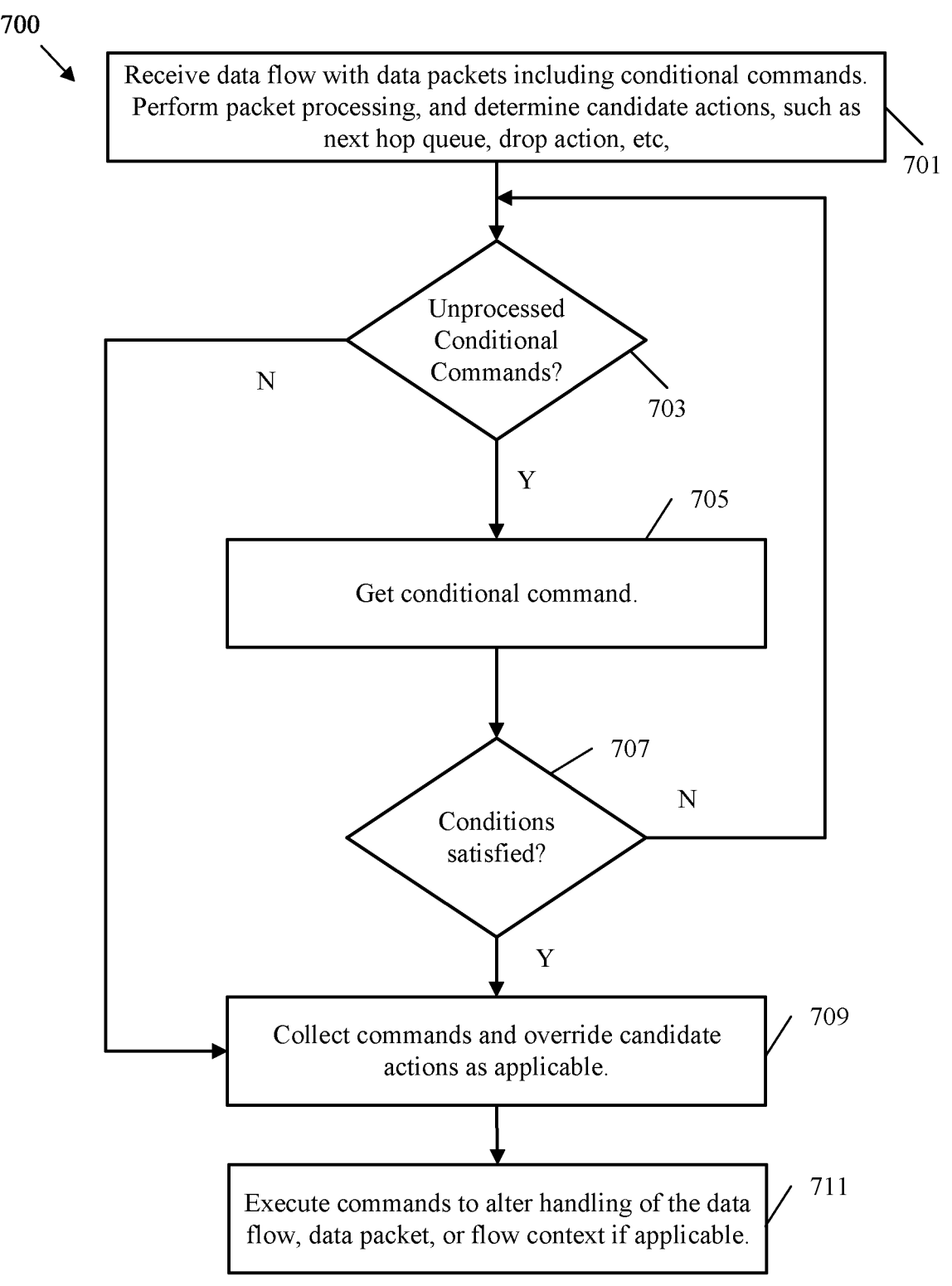
FIG. 7 is a flowchart of an example method for implementing conditional commands carried by data packets.

FIG. 7 is a flowchart of an example method 700 for implementing conditional commands carried by data packets. For example, method 700 may be implemented by a network device 200 acting as an edge node 111 or internal nodes 112 routing flows 121 and packets 122. Accordingly, method 700 may be employed to execute conditional commands by reading data packet headers, such as data packet header 300 and/or 400, containing a conditional command block, such as conditional command block 500. In some cases, method 700 may also communicate via BPP and hence operate on a BPP header 600.

At block 701, a node may receive a data flow with data packets including conditional commands. The node performs packet processing, and may determine candidate actions, such as next hop queue updates, drop actions, etc. Such candidate actions include routing actions the node would otherwise take if no conditional command were present. Accordingly, such candidate actions may include packet handling actions that are to be applied unless conditional commands override such actions and lead to a different outcome.

At block 703, the node determines whether there are unprocessed conditional commands in the packet. If not, the node may proceed to block 709. If there are unprocessed conditional commands in the packet, the node proceeds to block 705. At block 705, the node obtains the conditions and associated command(s) from the conditional command and proceeds to block 707. At block 707, the node determines whether the condition(s) are satisfied. If the condition(s) are not satisfied, the node makes no changes to the candidate actions and returns to block 703 to check for additional unprocessed conditional commands. If the condition(s) are satisfied, the node proceeds to block 709, At block 709, the node collects commands and overrides/supplements candidate actions as applicable. Accordingly, the node may determine that the condition(s) are satisfied at block 707. Based on the determination that the condition(s) are satisfied, the node may then execute the corresponding command(s) to alter handling of the data flow, alter handling of the data packet, and/or alter/update a flow context at block 711. If the conditions are not satisfied at block 707 the packet is handled based on the information in the packet header according to the candidate actions (e.g., according to general routing protocol).

Many conditional commands may be orthogonal in terms of what such commands affect (e.g., one updating flow context, another deciding packet priority, etc.). The head-end node and/or the endpoint may select conditional commands to avoid conflicting instructions that might result in undesired non-deterministic behavior.

Further, while method 700 depicts a basic processing flow that may be conducted on a node for any packet that arrives, various optimizations of this basic processing flow are possible. For example, such a processing flow may be optimized with regards to an order for executing commands. For example, complementary instructions can be carried out immediately. Further, the sequence of execution of conditional instructions can be subject to parallelization.

As a particular example, a packet might contain instructions indicating how a packet should be handled when congestion is encountered at an egress interface. An application might decide that the packet is not really critical in such a case and could be dropped. In this case, the condition could be the level of utilization on the intended egress interface above a specified threshold. The corresponding action/command could then be to drop this packet. A parameter could then contain the threshold level for the condition. This and many other functions can be created by employing conditional commands as discussed above.

The disclosure includes a network device comprising: a receiving means for receiving a data flow including a data packet, the data packet including a conditional command; and a processing means for obtaining a condition and an associated command from the conditional command; determining that the condition is satisfied; and based on the determination that the condition is satisfied, executing the command to alter handling of the data flow, alter handling of the data packet, or alter a flow context for the data flow.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network device comprising:
a receiver configured to receive a data packet including a conditional command block located between a data link header and a transport header of the data packet, the conditional command block comprising a conditional instruction set header indicating a number of conditional command fields in the conditional command block, a conditional command field comprising at least one command and at least one condition;
a memory storing instructions; and
at least one processor coupled to the receiver and the memory, the at least one processor configured, upon execution of the instructions, to perform the following steps:
obtain a conditional command from the command block;
obtain a condition from the conditional command field of the conditional command;
determine that the condition is satisfied; and
execute the command based on the determination that the condition is satisfied.

2. The network device of claim 1, wherein the conditional command field further includes one or more command parameters, a command parameter of the command parameters including an input value for the command.

3. The network device of claim 1, wherein the conditional command field further including a condition parameter, the condition parameter including data indicating a value to support evaluation of the condition.

4. The network device of claim 1, wherein the command is a complementary command executed in addition to the stored routing instructions.

5. The network device of claim 1, wherein the command is an override command executed instead of the stored routing instructions.

6. The network device of claim 1, wherein the command instructs the network device to perform at least one of: modifying a resource allocation for the data flow, modifying a chosen next hop for the data flow, or updating a flow context for the data flow.

7. The network device of claim 1, wherein the command instructs the network device to perform at least one of: modifying data in the data packet, modifying a chosen next hop for the data packet, modifying a priority for the data packet, dropping the data packet, buffering the data packet, or modifying metadata in the data packet.

8. The network device of claim 1, wherein determining the condition is satisfied includes performing at least one of: parsing data from the data packet, checking a flow context of a data flow including the data packet, checking a state of the network device, comparing data items, or checking an identity of the network device.

9. A method comprising:
receiving, at a receiver in a network device, a data packet including a conditional command block located between a data link header and a transport header of the data packet, the conditional command block comprising a conditional instruction set header indicating a number of conditional command fields in the conditional command block, a conditional command field comprising at least one command and at least one condition;
obtaining, by a processor in the network device, a command from the command block;
obtaining, by the processor, a condition from the conditional command field of the conditional command;
determining, by the processor, that the condition is satisfied; and
executing, by the processor, the command based on the determination that the condition is satisfied.

10. The method of claim 9, wherein the conditional command field further includes one or more command parameters, a command parameter of the command parameters including an input value for the command.

11. The method of claim 9, wherein the conditional command field further including a condition parameter, the condition parameter including data indicating a value to support evaluation of the condition.

12. The method of claim 9, wherein the conditional command field further including a global parameter, the data packet comprises at least one other conditional command, and the global parameter contains data indicating a value to support evaluation of at least two conditional commands in the data packet.

13. The method of claim 9, wherein the command is a complementary command executed in addition to the stored routing instructions.

14. The method of claim 9, wherein the command is an override command executed instead of the stored routing instructions.

15. The method of claim 9, wherein the command instructs the network device to perform at least one of: modifying at least one of a resource allocation for the data flow, modifying a chosen next hop for the data flow, or updating a flow context for the data flow.

16. The method of claim 9, wherein the command instructs the network device to perform at least one of: modifying data in the data packet, modifying a chosen next hop for the data packet, modifying a priority for the data packet, dropping the data packet, buffering the data packet, or modifying metadata in the data packet.

17. The method of claim 9, wherein determining the condition is satisfied includes performing at least one of: parsing data from the data packet, checking a flow context of a data flow including the data packet, checking a state of the method, comparing data items, or checking an identity of the method.

18. A non-transitory computer readable media storing computer instructions for use by a network device, that configure at least one processor, upon execution of the instructions, to perform the following steps:
receive a data packet including a conditional command block located between a data link header and a transport header of the data packet, the conditional command block comprising a conditional instruction set header indicating a number of conditional command fields in the conditional command block, a conditional command field comprising at least one command and at least one condition;

obtain a conditional command from the command block;

obtain a condition from the conditional command field of the conditional command;

determine that the condition is satisfied; and execute the command based on the determination that the condition is satisfied.

\* \* \* \* \*